United States Patent [19]

Thompson

[11] 3,815,479

[45] June 11, 1974

[54] COMPOUND MOTION FLUID ACTUATOR

[75] Inventor: Richard L. Thompson, Fort Wayne, Ind.

[73] Assignee: PHD, Inc., Fort Wayne, Ind.

[22] Filed: Jan. 20, 1972

[21] Appl. No.: 219,233

[52] U.S. Cl............................. 92/2, 92/136, 92/155
[51] Int. Cl. ..... F01b 21/00, F01b 9/00, F01b 31/10
[58] Field of Search................................. 92/2, 155

[56] References Cited
UNITED STATES PATENTS

| | | |
|---|---|---|
| 280,668 | 7/1883 | Rawlins..................................... 92/2 |
| 799,406 | 9/1905 | Schmucker .............................. 92/2 |
| 2,918,799 | 12/1959 | Geyer ....................................... 92/2 |
| 3,030,935 | 4/1962 | Hanes....................................... 92/2 |
| 3,212,411 | 10/1965 | Storms................................... 92/155 |
| 3,315,881 | 4/1967 | Halpin et al. ......................... 92/155 |
| 3,510,915 | 5/1970 | Johansson................................. 92/2 |
| 3,620,131 | 11/1971 | Ivitkiewicz............................... 92/2 |

*Primary Examiner—* Paul L. Maslousky

[57] ABSTRACT

The invention is a compound motion fluid actuator for producing simultaneously or separately both reciprocating and turning motions. The actuator includes a fluid-pressure operated rotary power device coupled to a reciprocable piston in a fluid-pressure power cylinder such that the piston rod connected to the piston has imparted thereto the reciprocal motion of the piston as well as the rotary motion of the rotary device. The piston is coupled to the rotary device by means of a coupling mechanism which prevents the force of fluid pressure acting against the piston from being communicated to the functional parts of the rotary device.

9 Claims, 2 Drawing Figures

PATENTED JUN 11 1974      3,815,479

INVENTOR:
RICHARD L. THOMPSON,
BY
ATTORNEYS.

COMPOUND MOTION FLUID ACTUATOR

BACKGROUND OF THE INVENTION

1. Field of the Invention

The present invention relates to a compound motion fluid actuator which operates with pressure fluids such as hydraulic fluid or compressed air and more specifically to such a compound motion actuator in which a member is linearly reciprocated while simultaneously being rotatable.

2. Description of the Prior Art

Compound motion actuators are well known to the art. It is common in such actuators to utilize complex mechanisms including hinged arms, beveled gears and the like whereby rotary motion may be imparted to a member during reciprocation thereof. In others relatively complex mechanisms are employed for reciprocating a member utilizing pressure fluid while simultaneously therewith imparting rotation thereto through the use of relatively bulky rack pinions laterally offset from the reciprocating parts. An example of this is disclosed in U.S. Pat. No. 3,406,837.

SUMMARY OF THE INVENTION

The invention in its broader aspect is a compound motion fluid pressure actuator which produces simultaneously linear and rotary motion and comprises generally a housing, gear means in the housing for converting linear motion into rotary motion and at least one rack gear reciprocally carried in the housing. A fluid pressure actuating device operatively connected to the rack gear imparts linear motion thereto. The gear means further include a rotary gear meshed with the rack gear. A power cylinder is attached in fluid-tight relation at one end to the housing, a hollow piston rod is coaxially fitted to the piston in the cylinder and extends beyond the other end of the cylinder, and a guide rod telescopically fits into the hollow piston rod for controlling rotation thereof while permitting reciprocation. Means are provided for preventing relative rotation between the guide rod and the piston rod.

The guide rod is connected to the rotary gear in coaxial relation therewith whereby rotary movement of the rotary gear is imparted to the guide rod. The cylinder, piston and housing define a fluid pressure chamber through which the guide rod coaxially extends. Means are provided for sealing the chamber from the rotary gear, and other means are provided for preventing the force of fluid pressure in the chamber from being communicated to the rotary gear.

It is an object of this invention to provide an improved compound motion fluid pressure actuator.

It is another object of this invention to provide such an actuator which is simple in construction, small in size, and durably constructed.

It is yet another object of this invention to provide a combination of a rotary actuator and a power cylinder wherein the piston is coaxially connected to the rotating gear of the actuator in a unique manner so as to isolate the rotary gear from the reaction of pressure fluid applied to the piston as well as provide for any coaxial misalignment.

The above-mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE PREFERRED EMBODIMENT

Figures 1, 2:
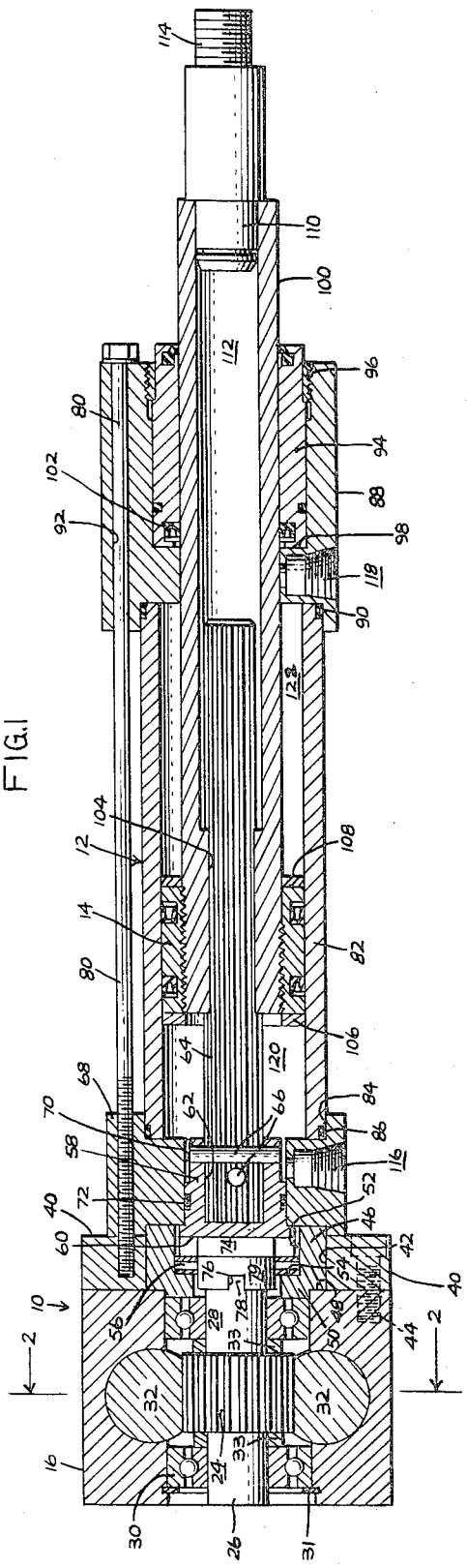
FIG. 1 is a longitudinal sectional view of one embodiment of this invention.
FIG. 2 is a cross-sectional view of the rotary actuator thereof taken substantially along such a line 2—2 of FIG. 1.

Referring to the drawings, a rotary actuator generally indicated by the numeral 10 for producing rotary motion is coupled to a power cylinder 12 having a reciprocable piston 14, a coupling being provided for imparting rotary motion from the actuator 10 to the piston 14. First to be described will be the rotary actuator 10. A rotary actuator of the type which may be used with this invention is fully disclosed and claimed in Grotness, U.S. Pat. Application Ser. No. 105,483 filed Jan. 11, 1971. Insofar as is necessary to complete the disclosure of the preferred embodiment of this invention, the disclosure of the aforesaid Pat. Application is included herein by reference. Referring to the drawings, the actuator 10 includes a rectangular housing 16 having a cylindrical chamber 18 therein and two parallel cylindrical bores 20 and 22 on diametrically opposite sides thereof as shown. Received in the chamber 18 is a spur gear 24 having oppositely extending stub shafts 26 and 28 journaled in conventional bearing assemblies 30 secured in the housing 16. Suitable means such as snap ring 31 and annular spacers 33 are provided for securing the bearings 30 and the spur gear 24 in place in the housing 16 and to prevent loose motion axially that could interfere with operation.

Two gear racks 32 are received for reciprocation in the bores 20 and 22, respectively, and meshed with the spur gear 24 as shown. Reciprocation of the gear racks 32 thereby impart rotary motion to the gear 24.

Coaxially extending from the housing 16 and the respective bores 20 and 22 thereof are cylinders 34 having pistons 36 therein engageable with the ends, respectively, of the racks 32. Suitable ports 38 in the ends of the cylinders 34 are provided for connection to sources of pressure fluid for actuating the various pistons 36. In operation, pressure fluid admitted to one of the ports 38 is communicated to the interior of the related cylinder 34 and against the respective piston 36 forcing the latter against the respective rack 32. Motion of the rack 32 imparts rotation to the gear 24 and the associated stub shafts 26, 28. With suitable conventional valving (not shown) connected in the fluid pressure lines leading to the ports 38, reciprocable motion of the pistons 36 and the associated racks 32 is produced.

An open side of the housing 10 is closed by a flat plate 40 having an opening 42 coaxial with the stub shaft 28 fastened to the side of the main body of the housing 10 by means of suitable bolts 44.

A stepped diameter pilot ring 46 is received in the opening 42 and engages the flat side 48 of the main body of the housing 16 as shown. A smaller diameter portion 50 on the ring 46 lightly engages the bearing assembly 30 to limit sideward motion of the latter.

The pilot ring 46 has a stepped diameter bore 52 therein coaxial with respect to the shaft 28 provided with a flat radial shoulder 54 having seated thereagainst a thrust-bearing assembly 56. Bearing against the opposite side of the thrust-bearing assembly 56 is the flat annular surface of a rotary coupler 58 generally of cylindrical shape having a diametral slot 60 for a purpose to be explained later and also a cylindrical coaxial splined socket 62 adapted to receive snugly therein a splined guide rod or shaft 64. Two orthoganally related pins 66 as well as the splined connection secure the shaft 64 to the coupler 58 as shown.

The coupler 58 is journaled in an opening 70 in a cap block 68, a conventional O-ring seal 72 of rubber preventing leakage of pressure fluid between the coupler 58 and the opening 70.

Referring now to the purpose of the slot 60 in the left-hand face of the coupler 58, this is part of a rotary connection referred to in the art as a slider coupling composed essentially of slidably engaged parts so fitted together as to provide for axial misalignment between two rotary elements being connected together. The slider coupling includes a small disc 79 having a diametral key 74 projecting beyond one flat side thereof to be received slidably by the slot 60. The slot 60 and the key 74 are preferably of rectangular cross-section of complementary size whereby a sliding fit without lost motion is provided therebetween.

The disc 79 is also provided with a diametral slot 76 like the slot 60 at right angles to the key 74. On the distal end of the stub shaft 28 is a key portion 78 like the key 74 which fits into the slot 76. As the shaft 28 rotates, rotary motion is imparted to the disc 79 and to the coupler 58 via the key 74 and slot 60 connection. If there is any axial misalignment between the coupler 58 and the shaft 28, relative sliding motion provided by the slider coupling just described will accommodate the same without binding.

The cap block 68 is so formed as to engage the pilot ring 46 and the plate 40 as shown thereby to secure the parts together. Suitable elongated bolts 80 which penetrate the block 68 to be threaded into the plate 40 as shown clamp these various parts together as will be explained more fully later on.

The power cylinder 12 includes a tubular casing 82 which receives for reciprocation the piston 14. The left-hand end of the casing 82 fits into a companion socket 84 in the block 68 as shown and is provided with a fluid-tight connection therewith by means of a rubber O-ring seal 86. The opposite end of the casing 82 fits into a similar cavity in an end block 88, a suitable rubber O-ring seal 90 preventing leaking of pressure fluid therefrom. The end block 88 is provided with a series of axially extending holes 92 that receive respective ones of the bolts 80. By drawing the bolts 80 tightly into place, the block 88, the casing 82, the block 80 and the plate 40 are securely clamped together.

Coaxially fitted within the block 88 is a sleeve bushing 94 secured in place by means of an annular retainer 96 threaded into the block 88. The retainer 96 bears against a radial shoulder on the bushing 94, clamping the latter against the end surface 98 of the cavity that receives the bushing 94 as shown.

Reciprocally received by the bushing 94 is a hollow piston rod 100. Suitable cup-shaped sealing rings 102 of rubber seated in the bushing 94 engage the piston rod 100 to prevent leakage of pressure fluid.

The piston rod 100 is threadedly secured coaxially to the piston 14. A portion 104 of the piston rod 100 is splined and engaged slidably with the splined shaft 64 such that rotation of the latter will cause rotation of the rod 100 as well as the piston 14. The shaft 64 as shown slidably projects into the piston rod 100 such that the piston 14 may freely reciprocate in the casing 82 while simultaneously being rotated by the shaft 64.

Thrust washers 106 and 108 are secured in engagement with the opposite ends, respectively, of the piston 14 as shown, and are fabricated preferably of shock-absorbing and lubricous plastic material such as polytetrafluoroethylene (Teflon), nylon or the like. These washers may be secured to the piston by means of suitable bonding adhesives or press fitted over suitably extended portions of the hollow rod 100 such that the washers move in unison with the piston 14. At the opposite ends of the piston 14 stroke, the respective washers engage the facing surfaces of the end blocks 68 and 88 thereby absorbing shock of impact and minimizing rotational friction of piston engagement with the end blocks 68 and 88. Alternatively, the washers 106 and 108 may be secured against the facing surfaces of the end blocks 88 and 68 by bonding or press fitting in the cylinder 82 for engagement by the piston 14 thereby to serve the same purposes as the piston mounting thereof.

The distal end of the piston rod 100 is closed by means of a cylindrical plug 110 which preferably is silver soldered in place. This securement is of such character as to provide a fluid seal such that pressure fluid in the hollow 112 of the piston rod 100 cannot escape. The outer end of the plug 110 is threaded as indicated at 114.

Suitable ports 116 and 118 are provided in the blocks 68 and 88, respectively, for connecting a source of pressure fluid to the two cylinder chambers 120 and 122 defined by the piston 14 in the casing 82. Thus, pressure fluid admitted to the port 116 will drive the piston 14 toward the right, port 18 being connected to a lower pressure or atmosphere, while port 118 conducts pressure fluid to the chamber 122 which drives the piston 14 leftwardly, port 116 being connected to atmosphere or the like.

In operation, the rotary motion of the piston rod 100 is provided by the control of pressure fluid admitted to the piston and cylinder combinations 34, 36 of the rotary actuator 10. Rotation of the gear 24 and its shaft 28 is imparted to the splined shaft 64, this turning the piston rod 100. Reciprocatory motion of the piston rod 100 is produced by operation of the piston 14 through the control of admitting and exhausting pressure fluid via the ports 116 and 118 to the chambers 120 and 122.

Of importance in this invention is the fact that pressure fluid admitted to the chamber 120 in acting against the piston 14 also reacts in the direction of the rotary coupler 58. This results in axial force being exerted against the thrust-bearing assembly 56, and in turn against the pilot ring 46 and the housing 16. Note that due to the engagement between the pilot ring 46 and the surface 48 on the housing 16, none of this reactionary force is communicated to the adjacent bearing assembly 30 or the shaft 28. Thus, the force of pressure fluid admitted to the chambers 120 and 122 is never communicated to the working parts of the rotary actuator 10 which would otherwise interfere with the operation thereof. By the same token, due to the slider coupling 28, 72, 60 any axial misalignment between the reciprocating and rotary parts is accommodated while simultaneously preventing the transmission of any reactionary axially directed force to the rotary mechanism as just explained.

Also, the fluid pressure in chamber 120 acts against the radially exposed surfaces of the coupler 58 forcing it leftward such that the radial shoulder 60 tends to separate from the contiguous radial shoulder on the end block 68 such that frictional contact therebetween is minimized and resistance against rotation of the coupler 58 is reduced. Through the use of the lubrication washers 106 and 108 and the coupling mechanism just described which operates in conjunction with the fluid pressure in chamber 120, the piston 14 and its related mechanism may rotate with a minimum of friction either while it is being reciprocated or in contact with the facing surfaces of either the end blocks 68 and 88.

The actuator of this invention is in effect not much larger than the reciprocating power cylinder 12 itself, the enlargement being due to the rotary actuator 10 on one end thereof. The compound motion of reciprocation and rotation is thus conveniently and efficiently achieved with a minimum of parts assembled in a relatively small package in such a manner as to provide substantial wear life in the finished mechanism.

While there have been described above the principles of this invention in connection with specific apparatus, it is to be clearly understood that this description is made only by way of example and not as a limitation to the scope of the invention.

What is claimed is:

1. A compound motion fluid actuator comprising a housing, gear means in said housing for converting linear motion into rotary motion and including at least one rack gear reciprocably carried in said housing, a fluid pressure actuating device operatively connected to said rack gear for imparting linear motion thereto, said gear means further including a rotary gear meshed with said rack gear; a power cylinder having a piston therein, said cylinder being attached in fluid-tight relation at one end to said housing, a hollow piston rod coaxially affixed to said piston and extending beyond the other end of said cylinder, a guide rod telescopically received by said hollow piston rod, means for preventing relative rotation between said guide rod and said piston rod, rotary means connecting said guide rod to said rotary gear in coaxial relation for imparting rotation of said rotary gear to said guide rod, said cylinder, piston and housing defining a fluid pressure chamber through which said guide rod coaxially extends, means for sealing said chamber from said rotary gear, reaction-absorbing means operatively interposed between said guide rod and said rotary gear for preventing the force of fluid pressure in said chamber from being communicated to said rotary gear, and universal means forming part of said rotary connecting means interposed between said guide rod and said rotary gear for compensating for axial misalignment between said rotary gear and said guide rod.

2. The apparatus of claim 1 wherein said one end of said cylinder is provided with a coaxial journal opening, said rotary-connecting means at least in part being journaled in said opening, means providing a fluid-tight seal between said rotary-connecting means and said journal opening.

3. The apparatus of claim 1 wherein said reaction-absorbing means includes radial portions on said housing and on said rotary-connecting means operatively engaged to absorb axial thrust of said guide rod toward said rotary gear.

4. The apparatus of claim 1 wherein said one end of said cylinder is provided with a coaxial journal opening, said rotary-connecting means at least in part being journaled in said opening, means providing a fluid-tight seal between said rotary-connecting means and said journal opening, said reaction-absorbing means including radial portions on both said housing and said rotary-connecting means that are operatively engaged to absorb axial thrust of said guide rod toward said rotary gear.

5. The apparatus of claim 4 in which said radial portions have a thrust bearing therebetween, said rotary-connecting means including engaged portions radially movable relative to each other which compensates for axial misalignment between said guide rod and said rotary gear.

6. The apparatus of claim 5 in which said one end of said cylinder includes a cap block having said journal opening therein, said rotary-connecting means including a cylindrical coupling coaxially journaled in said opening, a rubber sealing ring coaxially disposed between said cylindrical coupling and said journal opening, said cylindrical coupling having one of said radial portions thereon engaged with said thrust bearing, said housing being secured to said cap block, said housing having the other of said radial portions with which said thrust bearing is operatively engaged, said cylindrical coupling also constituting one part of said universal rotary coupling, a shaft secured to said rotary gear with the end thereof serving as another part of said universal coupling, a third part being interposed between said two parts of said universal coupling, said three parts constitution a slider coupling having orthogonally related key and slot connections which accommodate misalignment between said guide rod and said gear shaft, said guide rod being coaxially secured to said cylindrical coupling, and a port in said cap block communicating with said chamber.

7. The apparatus of claim 6 in which said journal opening communicates with said fluid pressure chamber, said cylindrical coupling having a radially disposed surface exposed to said chamber and fluid pressure therein for urging said rotary-connecting means into engagement with said thrust bearing and the radial portion on said housing thereby tending to separate axially facing surfaces of said rotary-connecting means and said cap block for relieving frictional contact therebetween.

8. The apparatus of claim 1 wherein said power cylinder includes opposite end blocks with which the ends of said piston are respectively engageable, plastic lubricating means interposed between said piston ends and said end blocks for minimizing rotational friction caused by rotation of said piston when engaged with said end blocks, respectively.

9. The apparatus of claim 8 in which said lubricating means includes two plastic washers on the opposite ends of said pistons, respectively, said washers being engageable with said end blocks, respectively, at the opposite extremities of the piston stroke thereby absorbing shock of impact as well as reducing rotational friction when said piston moves against an end block and concurrently rotates relative thereto.

* * * * *